Nov. 8, 1966  G. A. GUTEKUNST  3,283,925
STORAGE STRUCTURE WITH SIDE DRAW-OFF
Filed Jan. 18, 1965  2 Sheets-Sheet 1

INVENTOR.
Gerald A. Gutekunst
BY
Scofield, Kokjer, Scofield & Lowe
ATTORNEYS.

INVENTOR.
Gerald A. Gutekunst
BY
Scofield, Kokjer, Scofield & Lowe
ATTORNEYS.

United States Patent Office 3,283,925
Patented Nov. 8, 1966

3,283,925
STORAGE STRUCTURE WITH SIDE DRAW-OFF
Gerald A. Gutekunst, Independence, Mo., assignor to Butler Manufacturing Company, a corporation of Missouri
Filed Jan. 18, 1965, Ser. No. 426,317
5 Claims. (Cl. 214—17)

This invention deals generally with the storage and withdrawal of bulk materials such as grains, chemicals and feeds and the like, and refers more particularly to the provision of a side draw-off storage structure having greatly improved flow characteristics as compared with those with which I am familiar.

The present invention is somewhat akin in purpose to that disclosed and claimed in U. S. Patent No. 3,090,507 issued May 21, 1963, in which I am a joint inventor.

One of the principal objects of the present invention is to provide a storage structure of the hopper bottom type having provision for side draw-off and which is capable of better handling of materials which are not regarded as free-flowing materials. The structure of the invention has special aptitude and advantages in the handling of mixed feeds, particularly those which by reason of size, surface texture and/or exterior moisture or liquid content, tend to stick together and fail to flow readily by gravity as support is removed from below.

Another object of the invention is to provide a structure of the character described having a side mounted conveyor tube which is adjustable angularly in a vertical plane so as to vary the elevation of the discharge end thereof as desired while still obtaining efficient withdrawal of the material from the interior of the storage structure.

Other and further objects of the invention together with the features of novelty appurtenant thereto will appear in the course of the following description.

In the accompanying drawings, which form a part of the specification and are to be read in conjunction therewith and in which like reference numerals indicate like parts in the various views.

Figure 1:
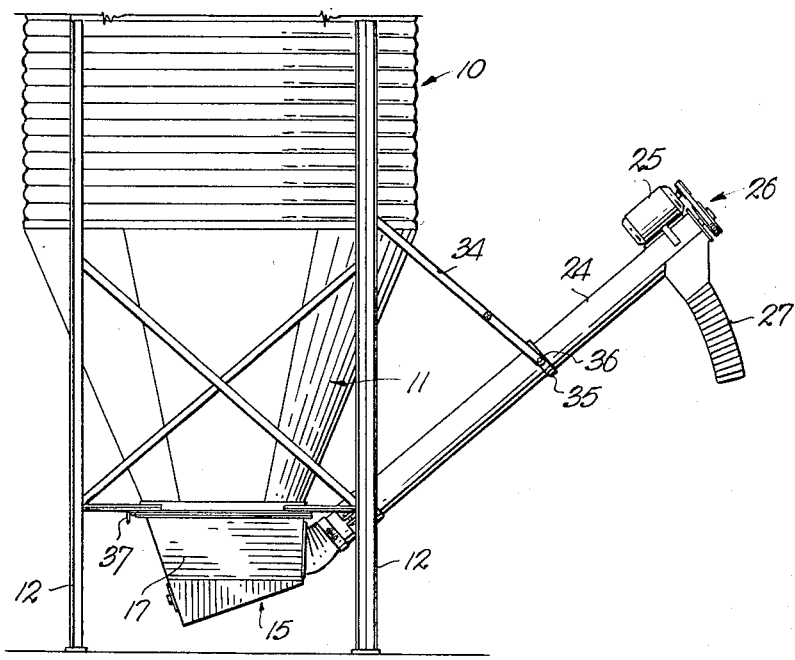
FIG. 1 is a side elevational view of a typical storage tank constructed in accordance with a preferred embodiment of the invention.

Referring to the drawings, reference numeral 10 indicates generally an elevated storage tank or structure which terminates at it slower end in a funnel-like hopper having the wall 11. The storage structure illustrated is cylindrical, being formed of corrugated metal panels bolted or otherwise suitably joined to one another. The tank is carried on vertical standards 12 which are secured in any conventional fashion to the main tank body.

Instead of being truly conical, the hopper wall 11 is formed as a transition from a circular cross section at the upper end to an oblong opening 13 at the lower end. This opening has the parallel side edges 13a and the opposite rounded end edges 13b. Preferably the minimum slope of the hopper side wall interior at any location around its perimeter is 60°. This minimum slope will, of course, occur along a line defined by a vertical plane which bisects the side edges 13a. The dimensions of the opening 13 are such that the length at least equals twice the width. The opening is also defined in a collar 14 having the upturned flange 14a extending around and receiving the lower end of the hopper.

Positioned below and secured to the collar 14 is the boot structure 15. This structure comprises the rear end wall 16, which is sloped substantially at the same angle as the hopper wall section thereabove, the side walls 17, a bottom wall 18 and a front end wall 19. The bottom wall 18 is inclined upwardly proceeding from the rear end wall 16 toward the front end wall 19. It will be noted that the side walls 17 converge inwardly and downwardly.

Positioned within the boot 15 is a screw auger 20. The auger runs substantially parallel with the bottom wall 18. Its rearward end is supported in the tail bearing 21 secured to the rear end wall 16.

The forward end of the boot auger screw 20 terminates adjacent a circular opening 19a formed in the front wall 19 and through which material can be delivered by the auger 20 during rotation thereof. The forward end of the auger 20 is connected through a universal joint 22 to the shaft 23 of an auger which extends lengthwise in the cylindrical auger tube 24. The tube 24 carries at its outer end the motor 25 which is drivingly connected with the auger shaft 23 through the medium of a belt and pulley connection 26 at the upper end of the tube. A discharge spout 27 leads from the upper end of the tube 24.

The lower end of the tube 24 is pivoted to the front end wall 19 of the boot for movement in a vertical plane about a horizontal axis defined by the pivot bolts 28. These bolts extend from the interior of the tube outwardly in opposite directions through the outstanding legs of brackets 29 secured to the boot end wall 19 on opposite sides of the tube. The brackets and bolts are so located that the bolts lie in a common axis proceeding through the center of the universal joint 22.

It will be noted that the lower end of tube 24 is provided with mitered surfaces 24a to permit pivotal movement of the tube about the axis 28. The brackets 29 can be secured to the front end wall 19 of the boot in any desired fashion, as by bolts 30.

To prevent the escape of material from the hopper through the opening 19 and between the edges 24a of the tube and the hopper end wall there is provided a flexible sleeve or duct 31 which may be constructed of any suitable material such as reinforced canvas, nylon or other fabric coated with a waterproofing substance such as neoprene. The sleeve 31 surrounds the lower end portion of the conveyor tube 24 and has one end secured firmly to and sealed around the tube by a clamping collar 32. The other end of sleeve 31 is anchored to the exterior of the end wall 19 by means of a ring-like anchor collar 33 bolted or otherwise firmly secured to end wall 19 with the end of the sleeve therebetween. It will be evident that the length of the sleeve 31 should be such as to permit free movement of the conveyor between its upper and lower limiting positions without placing undue stress upon the sleeve.

To support the conveyor tube 24 at the elevations which is desired, suitable stays 34 connected respectively with the storage structure and the conveyor are provided. The conveyor end of stays 34 are secured to the conveyor by any suitable mounting such as the collar 35 and a pivot 36. The other ends of the stays can be connected in any suitable fashion with the standards 12 of the storage structure. If desired, stays 34 can be made telescopically adjustable to eliminate the necessity of changing the location of the upper end of the stay for short distances of upward movement.

Figure 2:
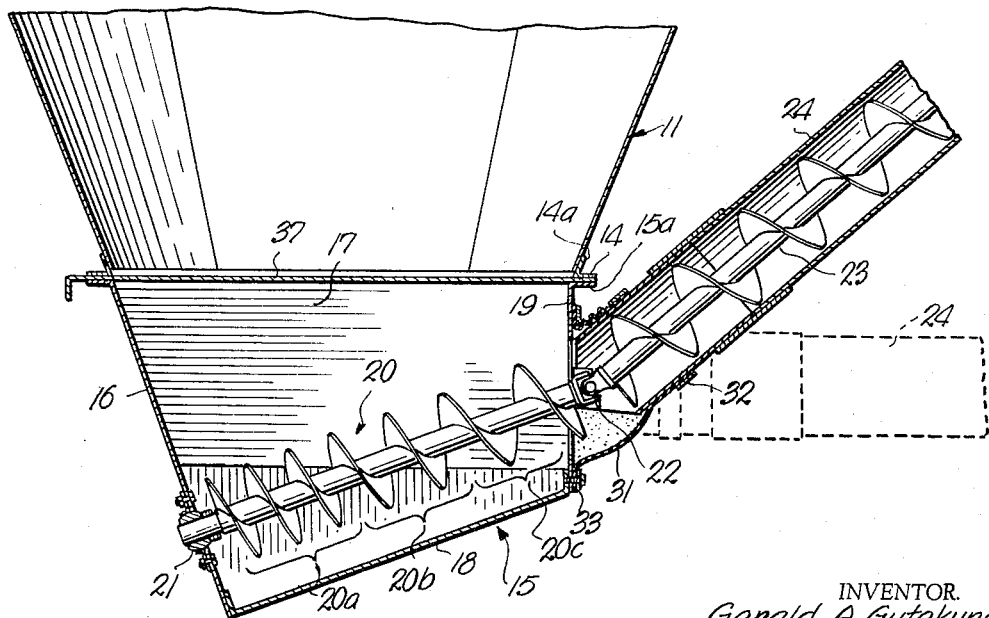
FIG. 2 is an enlarged sectional view taken generally along line 2—2 of FIG. 3 in the direction of the arrows.
Figure 3:
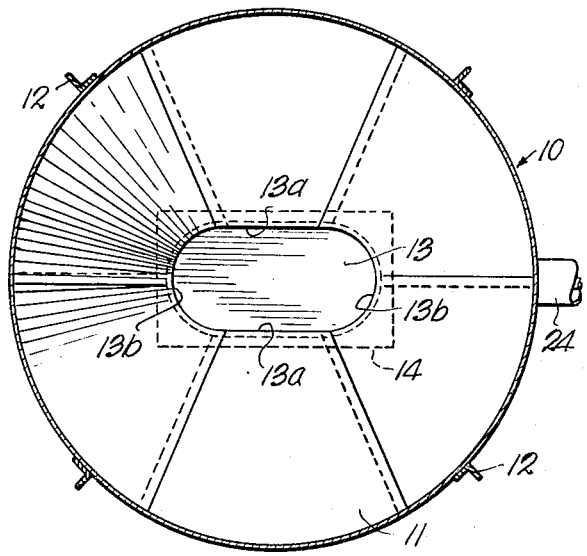
FIG. 3 is an enlarged horizontal sectional view taken along line 3—3 of FIG. 1 in the direction of the arrows.
Figure 5:
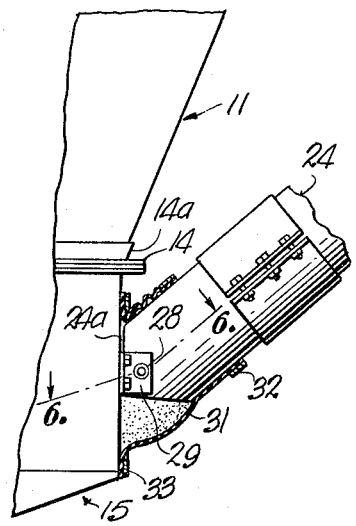
FIG. 5 is a fragmentary side elevational view of the forward end of the boot and adjacent lower end of the tube conveyor, the flexible sleeve being shown in section.
Figure 4:
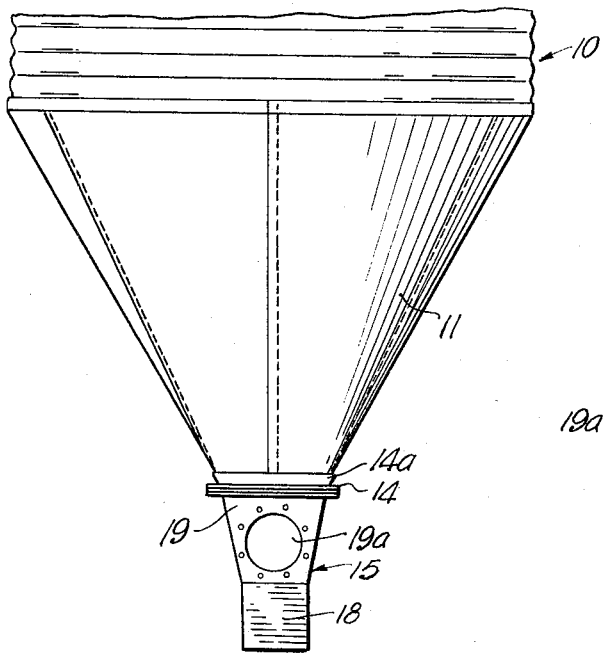
FIG. 4 is a fragmentary end elevational view taken from the right hand side of FIG. 1, the tube conveyor and the tank support standards not being shown.
Figure 6:
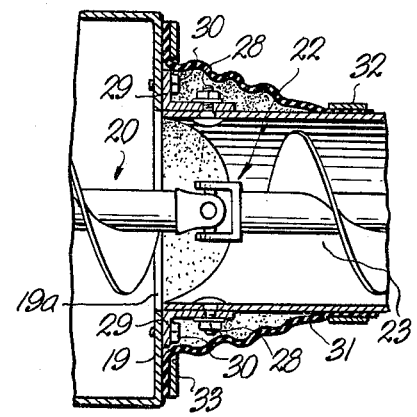
FIG. 6 is an enlarged sectional view taken along line 6—6 of FIG. 5 in the direction of the arrows.

Returning now to the interior of the boot 15 and further description of the interior screw auger 20, the pitch of the screw is changed along the length of the auger. For convenience the auger will be regarded as divided into the three sections 20a, 20b, and 20c as noted in FIG. 2. The sections 20c will be regarded as having maximum pitch. Section 20b is provided with a pitch equal to three-quarters of the pitch in section 20c while the pitch in section 20a is one-half that of the pitch in section 20c. The pitch thus increases proceding from the rearward end of the auger toward the forward end. This feature, taken in conjunction with the shape of the opening 13 and boot serves to produce the highly efficient discharge and handling of difficult materials which is the hallmark of the present invention.

To control flow of material from the hopper section 11 into the boot there is provided the sliding gate 37 which is slidably disposed between the flange 14 on the lower end of the hopper and a similar flange 15a formed on the upper end of the boot 15. This gate is shown in the closed position in FIGS. 1 and 2. Obviously, to open the gate it is necessary only to shift it to the left in which case material can flow through opening 13a into the boot.

In operation material flows into the boot essentially adjacent the front and rear end walls 16 and 19 of the boot. Actual observations have indicated that there are in effect two main currents of flow and these are substantially adjacent the front and rear end walls. This is produced in large part due to the varying pitch on the auger combined with the oblong opening. By virtue of the two flow currents, the tendency of the material to bridge is interfered with since the support points are progressively destroyed. Moreover, in the event that bridging may occur over one area of flow, still the other remains open and is only a matter of time until the bridge is broken.

The coincidence of the pivot axis defined by bolts 28 for tube 24 with the center of the universal joint 22 between the elevating auger and the internal boot auger makes it possible to set the tube 24 at different inclinations while still obtaining proper discharge from the boot. In the event that only limited movement would be desired or no movement at all, the auger 20 could be made simply as an extension from an elevating auger and the tail bearing 21 and universal joint thus eliminated.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A storage structure comprising
   an upright tank having a downwardly tapering hopper section, said hopper section terminating at its lower end in an oblong discharge outlet,
   a boot secured to the lower end of said hopper and forming a chamber below said outlet, said boot having front and rear end walls, opposed side walls, and a bottom wall, said bottom wall inclined upwardly from its juncture with the rear end wall to its juncture with the front end wall,
   said front end wall provided with a discharge opening, and
   a rotatable auger screw disposed in said chamber with its long axis substantially parallel with said bottom wall and aligned with said discharge opening,
   the pitch of said screw being non-uniform and greater on that portion of the auger nearest said front end wall than that portion nearest the rear end wall.

2. A storage structure as in claim 1 including sliding gate means between said boot and hopper and operable to cover and uncover said discharge outlet in response to movement of said gate means.

3. A storage structure as in claim 1 including a conveyor tube terminating at one end adjacent said discharge opening,
   means pivoting said tube adjacent said one end for movement about a horizontal axis,
   a second screw auger in said tube,
   a universal joint interconnecting said second auger with said first auger, the center of said joint lying on said horizontal axis, and
   a flexible sleeve having one end surrounding a portion of and sealed to the exterior of said conveyor tube and the other end sealing around the said discharge opening in said boot.

4. A storage structure as in claim 1 wherein the side walls of said boot converge inwardly and downwardly.

5. A storage structure as in claim 1 wherein said rear end wall is inclined with respect to the vertical inwardly toward said front end wall.

References Cited by the Examiner

UNITED STATES PATENTS

| | | | |
|---|---|---|---|
| 2,943,752 | 7/1960 | Platt | 214—17 |
| 2,991,870 | 7/1961 | Griffith et al. | 198—64 |
| 3,090,507 | 5/1963 | Gutekunst et al. | 214—17 |
| 3,100,052 | 8/1963 | Brembeck | 214—17 |
| 3,115,276 | 12/1963 | Johanningmeier | 222—413 X |

GERALD M. FORLENZA, *Primary Examiner.*
ROBERT G. SHERIDAN, *Examiner.*